April 15, 1952  H. W. TREVASKIS  2,593,073
RESILIENT TENSIONED WINDSCREEN
WIPER FOR CURVED WINDSCREENS
Filed Oct. 6, 1948

INVENTOR
Henry William Trevaskis
by Benj. T. Rauber
his attorney

Patented Apr. 15, 1952

2,593,073

UNITED STATES PATENT OFFICE 2,593,073

RESILIENT TENSIONED WINDSCREEN WIPER FOR CURVED WINDSCREENS

Henry William Trevaskis, Solihull, England, assignor to Dunlop Rubber Company Limited, London, England, a British company Application October 6, 1948, Serial No. 53,021
In Great Britain November 26, 1947

2 Claims. (Cl. 15—255)

This invention relates to improvements in windscreen wipers, particularly for use with windscreens having a curved surface such as are commonly used on aircraft.

An object of this invention is to provide a windscreen wiper in which the shape of the wiper blade is self-adjustable to maintain wiping contact with a screen surface, particularly a curved surface.

According to the present invention a windscreen wiper comprises a spindle adapted for attachment to an actuating means, a fixed arm attached thereto, a movable arm pivotally attached to said fixed arm so that the said movable arm is free to move only in the plane containing the said fixed arm and the spindle, and a resilient wiper blade having length adapted to contact a windscreen when the said spindle is rotated through an arc of not more than 180°, said blade being attached at one end of said movable arm and at the other end to said spindle or to the said fixed arm adjacent thereto.

The invention will now be more particularly described with reference to the accompanying drawings of which:

Figure 1:
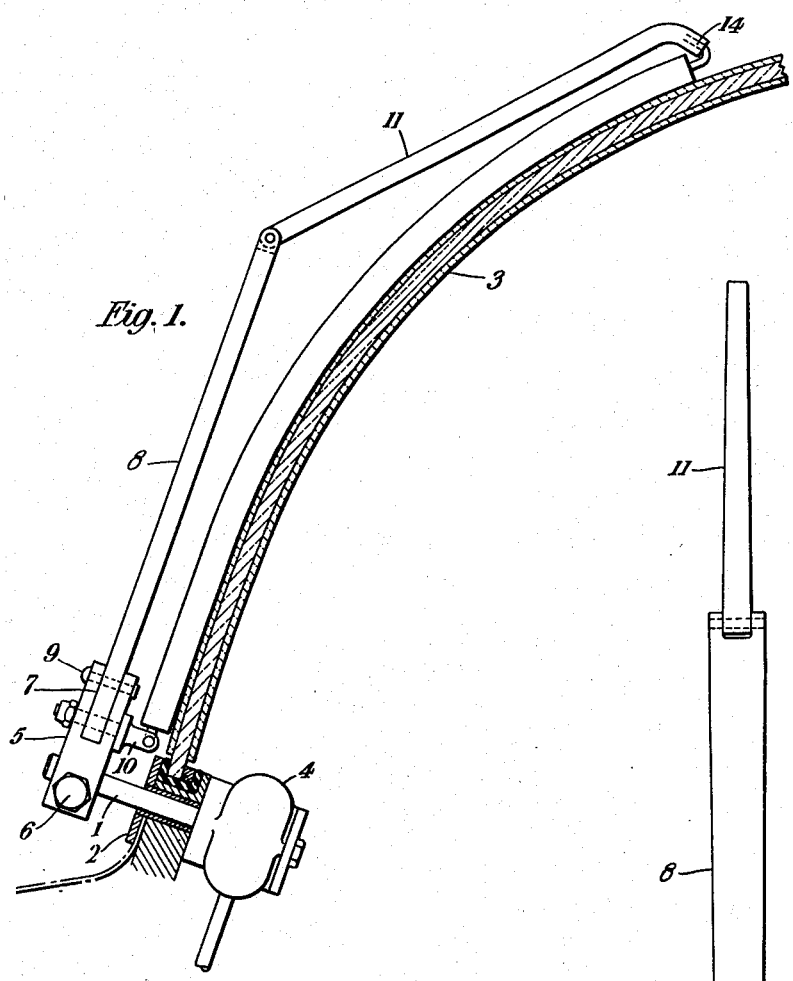
Fig. 1 shows a side elevation of one embodiment of the invention in position on a windscreen and Fig. 2 shows a plan view of the same embodiment.
Figure 3:
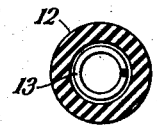
Fig. 3 shows a cross sectional view of one construction of a windscreen wiper blade.
Figure 2:
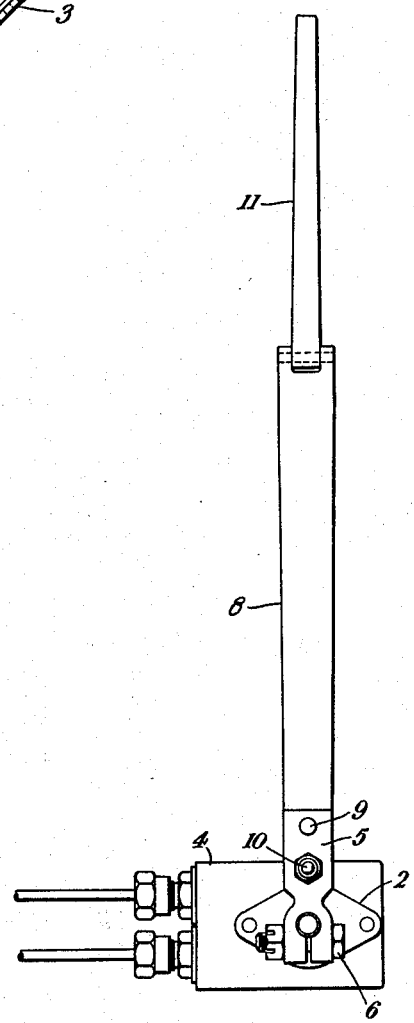

The windscreen wiper comprises a spindle 1 which passes through the support of the windscreen and is mounted in a bush 2 normal to the windscreen 3. The spindle is attached to a motor 4 mounted inside the cockpit of an aircraft adjacent the windscreen support. The motor is adapted to rotate the spindle through an arc of not more than 180°. A member 5 is attached to the spindle by a pinch bolt 6. The member 5 has a slot 7 normal to the axis of the spindle 1 wherein is positioned a fixed arm 8 by means of a screw 9 and an eye-bolt 10. At the free end of the fixed arm is pivoted a movable arm 11 which is free to swing about its pivot only in the plane containing the said fixed arm and the spindle.

The actual wiper blade comprises a rubber sleeve 12 containing a helical spring 13 having a hook shaped projection at each end. The hook at one end of the element is positional in a socket 14 at the free end of the movable arm 11 and the hook at the other end is attached to the eye-bolt 10.

The relation between the dimensions of a wiper and the shape of the screen with which it is associated must be such that on mounting the wiper the angle between the movable and fixed arms is increased, thus placing the wiper blade under tension. Then as the blade is in tension it tends to resume its free state and bears on the screen, conforming to the shape thereof by reason of its resilient nature. With the actuating means in operation the wiper swings from side to side with an angular movement about the axis of the spindle, the blade maintaining contact with and wiping the screen. A rubber roller or pad may be fitted to that end of the movable arm to which the wiper blade is connected, said roller or pad ensuring that the hard surface of the movable arm does not rub against the screen when the wiper is mounted and in operation.

It will be appreciated that although the wiper has been described for operation with a curved windscreen it is also capable of wiping windscreens which have a flat surface. Also although a wiper rotating on a spindle to give angular movement has been described, wipers can be constructed according to the invention to operate with a reciprocating motion.

Having described my invention, what I claim is:

1. A windscreen wiper which comprises a rotatable, actuating spindle, an arm fixed to said spindle, a movable arm pivotally attached to said fixed arm at a distance from said spindle on a pivotal axis normal to the plane containing the said fixed arm and said spindle to swing only in said plane, and a resilient wiper blade, said blade being attached at one end to said spindle and fixed arm assembly at a distance from said pivotal axis and at its other end to the free end of said movable arm, the length of said blade when not under tension being less than the combined lengths of said fixed and movable arms between the attachment points of said blade to tension said blade when said swinging arm and blade are pressed against a windscreen.

2. The windscreen wiper of claim 1 wherein the wiper blade comprises a helical spring and a rubber sleeve enclosing said spring.

HENRY WILLIAM TREVASKIS.

REFERENCES CITED

The following references are of record in the file of this patent:

UNITED STATES PATENTS

| Number | Name | Date |
|---|---|---|
| 1,684,477 | Demand | Sept. 18, 1928 |
| 2,149,037 | Zaiger | Feb. 28, 1939 |
| 2,193,724 | Horton | Mar. 12, 1940 |

FOREIGN PATENTS

| Number | Country | Date |
|---|---|---|
| 433,467 | Great Britain | Aug. 15, 1935 |
| 595,876 | Great Britain | Dec. 19, 1947 |
| 820,156 | France | July 26, 1937 |